United States Patent [19]

Baxter et al.

[11] Patent Number: 4,799,960
[45] Date of Patent: Jan. 24, 1989

[54] INK COMPRISING WATER SOLUBLE TRIAZINE DYE FREE FROM CELLULOSE REACTIVE GROUPS

[75] Inventors: Anthony G. W. Baxter, Manchester; Stephen B. Bostock, Bury; David Greenwood, Oldham, all of England

[73] Assignee: Canon Kabushiki Kaisha, Tokyo, Japan

[21] Appl. No.: 928,519

[22] Filed: Nov. 10, 1986

Related U.S. Application Data

[62] Division of Ser. No. 764,997, Aug. 12, 1985, Pat. No. 4,705,758.

[30] Foreign Application Priority Data

Aug. 24, 1984 [GB] United Kingdom ......... 8421556
Mar. 19, 1985 [GB] United Kingdom ......... 8507005
Mar. 21, 1985 [GB] United Kingdom ......... 8507310

[51] Int. Cl.[4] ............ C09D 11/00; C09D 11/02; C09D 11/16; C09D 11/18
[52] U.S. Cl. ............ 106/22; 534/796; 534/797; 534/573; 8/641
[58] Field of Search ............ 534/701; 106/22

[56] References Cited

U.S. PATENT DOCUMENTS

| | | | |
|---|---|---|---|
| 2,643,996 | 6/1953 | Widmer et al. | 534/701 X |
| 4,010,150 | 3/1977 | Tabei et al. | 534/701 |
| 4,337,195 | 6/1982 | Vater et al. | 534/701 |

FOREIGN PATENT DOCUMENTS

| | | | |
|---|---|---|---|
| 0168961 | 1/1986 | European Pat. Off. | 106/22 |
| 56-143275 | 11/1981 | Japan | 106/22 |
| 1457767 | 12/1976 | United Kingdom | 534/701 |

OTHER PUBLICATIONS

EP 11873, Bayer, Derwent Abst. 41902C.

Primary Examiner—Floyd D. Higel
Attorney, Agent, or Firm—Cushman, Darby & Cushman

[57] ABSTRACT

A water-soluble dye, free from cellulose reactive groups, of the formula:

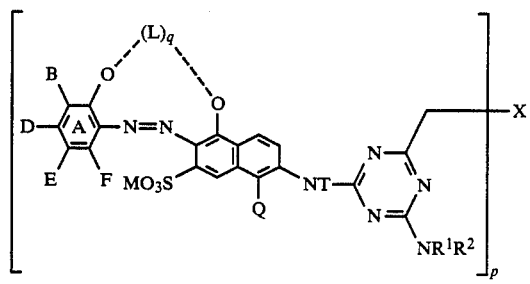

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
q is ½ or 1
p is 1 or 2
L is a transition metal capable of complexing with a dye
M is H, ammonium, or a monovalent metal;
Q is H or $SO_3M$
T is H or $C_{1-4}$-alkyl;
D is a substituted azo group;
B, E and F are H or substituents;
X is $NR^1R^2$, $NR^3R^4$, $-NR^3-Z-NR^4-$, $OR^3$, or the residue of a mono- or bis-azo chromophore comprising benzene, naphthalene or mono- or bicyclic heteroaryl diazo and coupling components, linked to the triazine nucleus through a primary or secondary amine linking group, wherein $R^3$ & $R^4$ each independantly are H, alkyl or aryl; and
Z is a divalent linking group; a mixture of this dye with an unmetallized orange dye of similar structure and an ink derived from the dye or dye mixture which is suitable for use in printing, especially ink jet printing.

17 Claims, 1 Drawing Sheet

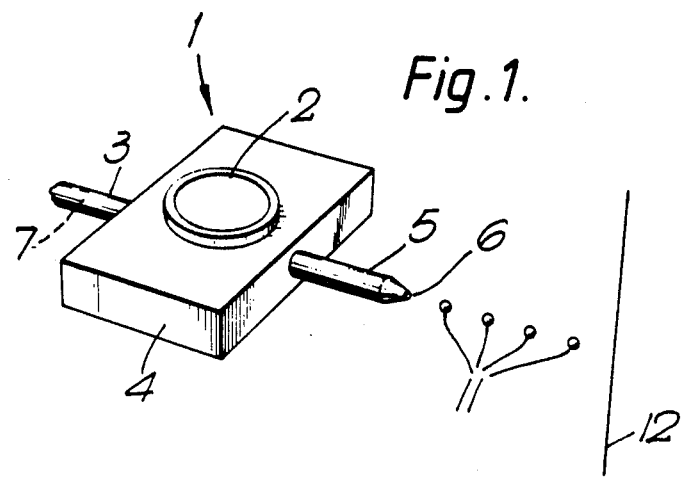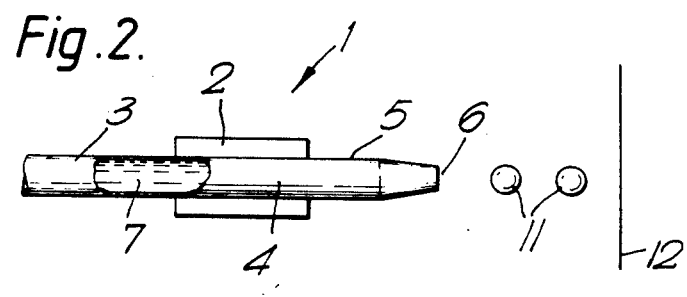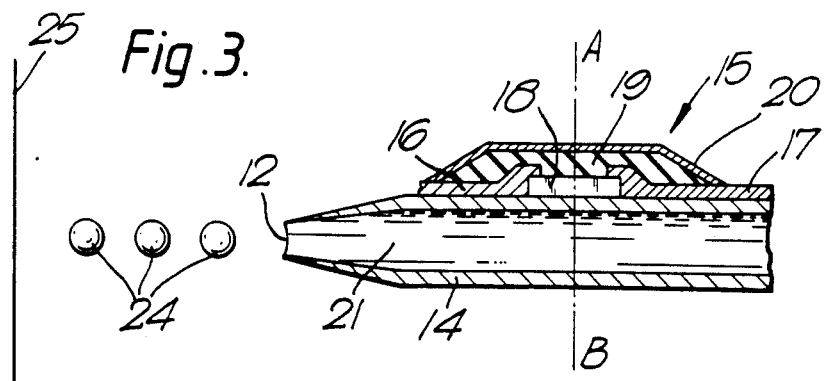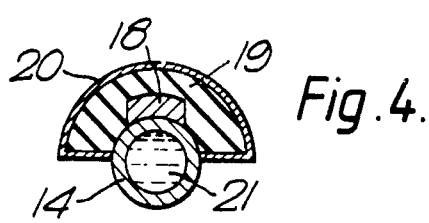

INK COMPRISING WATER SOLUBLE TRIAZINE DYE FREE FROM CELLULOSE REACTIVE GROUPS

This is a division of application Ser. No. 764,997, filed Aug. 12, 1985, now U.S. Pat. No. 4,705,758.

This specification describes an invention relating to a water-soluble first dye, to a mixture of the dye with a second dye, and to an ink containing the dye or the mixture which is suitable for use in ink jet printing.

THE FIRST DYE

According to a first apsect of the present invention there is provided a water-soluble dye, free from cellulose reactive groups, of the formula:

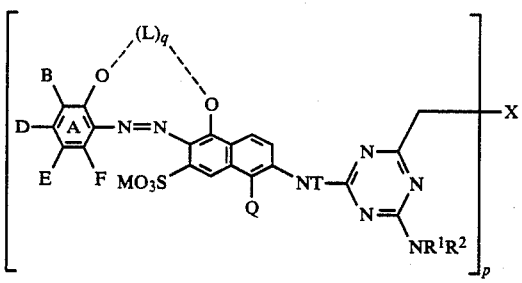

wherein $R^1$ is $-(C_aH_{2a}O)_m(C_bH_{2b}O)_nH$, $R^2$ is H or $-(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

q is $\frac{1}{2}$ or 1 p is 1 or 2

L is a transition metal capable of complexing with a dye

M is H, ammonium or a monovalent metal;

Q is H or $SO_3M$

T is H or $C_{1-4}$-alkyl;

D is a substituted azo group;

B, E and F are H or substituents;

X is $NR^1R^2$, $NR^3R^4$, $-NR^3-Z-NR^4-$, $OR^3$, or the residue of a mono- or bis-azo chromophore comprising benzene, naphthalene or mono- or bi-cyclic heteroaryl diazo and coupling components, linked to the triazine nucleus through a primary or secondary amine linking group;

Z is a divalent linking group; and $R^3$ and $R^4$ each independantly are H, alkyl or aryl.

If the dye contains more than one $-(C_aH_{2a}O)_m(C_bH_{2b}O)_nH$ group these may be the same or different. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)-propyl. It especially preferred that $R^1$ is hydroxyethyl and $R^2$ is H or $R^1$ and $R^2$ are both hydroxyethyl or $NR^1R^2$ is morpholino.

It is preferred that T is H or methyl.

L represents any suitable complexing transition metal but is preferably chromium, cobalt or copper or mixtures thereof, such as a 70:30 mixture of chromium and cobalt. Depending on the availability of electronic states in the metal, one atom of the metal may complex with one or two molecules of the dye, i.e. q may be 1 or $\frac{1}{2}$. In the following structures a 1:2 metal:dye complex is indicated by the symbol $(L)_{\frac{1}{2}}$ for the metal portion.

The groups represented by B, E and F on Ring A may be H or any of those conventionally present in azo dyes. It is also preferred that D is a substituted azo group, especially phenylazo or naphthylazo in which the phenyl or naphthyl group is optionally substituted. Examples of the optional substituents on Ring A, and on the phenyl or naphthyl ring of the substituted azo group represented by D, are sulphonate, carboxylate, $C_{1-4}$-alkyl, ureido, $C_{1-4}$-alkoxy, mono- and di-alkylamino, unsubstituted and mono- and di-alkylamino-sulphonyl and carbonyl, phenylamino, $C_{1-4}$-alkylcarbonylamino, hydroxy, nitro and halogen, especially chlorine. It is however, preferred that B and F represent H and that E is selected from aminosulphonyl, $C_{1-4}$-alkyl, sulphonate and halogen. It is also preferred that from 1 to 3 of the substituents on Ring A and D are sulphonate. A preferred example of D is 2,5-disulphophenylazo.

Where X is $NR^3R^4$, $R^3$ is preferably H or $C_{1-4}$-alkyl and $R^4$ is is preferably H, $C_{1-4}$-alkyl, mono- or bi-cyclic aryl or mono- or bi-cyclic heteroaryl. Where $R^4$ is mono- or bi-cyclic aryl, it is preferably a phenyl or naphthyl group carrying at least one sulphonic acid group, $SO_3M$, and optionally carrying other substituents, such as those exemplified above for Ring A.

Where X is $-NR^3-Z-NR^4-$, $R^3$ and $R^4$ are preferably the same and selected from H, $C_{1-4}$-alkyl and mono-cyclic aryl, especially phenyl or substituted phenyl, suitable substituents being those exemplified for $R^4$ above, or $R^3$ and $R^4$ together with Z and the nitrogen atoms form a divalent heterocyclic radical, such as piperazine. The linking group Z is preferably alkylene, especially $C_{1-6}$-alkylene, arylene, especially, phenylene or biphenylene, or aralkylene, especially $C_{1-4}$-alkylene-phen-4-ylene, all of which may substituted by any of the substituents exemplified above for Ring A and/or may be interrupted by atoms, such as carbon, oxygen, nitrogen and sulphur, which may themselves be part of groups, e.g. $-CH_2-$, $-SO_2-$ and $-NR^3-$. Alternatively the linking group Z may be a divalent thiophoric group e.g. it may be derived from a mono or bisazo or a stilbene chromophore. Examples of Z are ethylene, hexamethylene, $-SO_2CH_2-$ phen-1,4-ylene, phen-4-ylenesulphonyl, $-(CH_2)_2O(CH_2)_2-$, 4-(eth-2-ylene)phenylene, $-C_2H_4SO_2C_2H_4-$, diphen-4,4'-ylene, 2,2'-disulphodiphen-4,4'-ylene, diphen-4,4'-ylenemethane, diphen-4,4'-ylene ether and stilben-4,4'-ylene.

Where X is the residue of a mono- or dis-azo chromophore carrying a diazotistable amino group and comprising benzene, naphthalene or mono- or bi-cyclic heteroaryl diazo and coupling components, it is preferably the residue of a monoazo dye comprising benzene and naphthalene diazo components and benzene, naphthalene or monocyclic heteroaryl, such as 6-hydroxypyrid-2-ones and pyrazolin-5-ones, coupling components, preferably carrying at least one sulphonic acid group and optionally carrying other substituents. Examples of other substituents are $C_{1-4}$-alkyl, $C_{1-4}$-alkoxy, $C_{1-4}$-alkylcarbonylamino, mono- and di-alkylamino, phenylamino, ureido, nitro, halogen, especially chlorine, and hydroxy. The mono or bis-azo chromophore may be metallised provided it contains suitable substituents, such as OH or COOH, in ortho positions with respect to the azo group.

The amine linking group in X may be of the general formula —NR$^5$— in which R$^5$ is H, alkyl, preferably $C_{1-4}$-alkyl, or aryl, preferably phenyl, and it is preferred that R$^5$ is H or methyl.

Examples of groups represented by X are hydroxyethylamino, di(hydroxyethyl)amino, morpholino, NH$_2$, OCH$_3$, —NH—C$_2$H$_4$—NH—, 3-sulpho-4-nitrophenylimino, 3-sulphophenylimino, 3,5-disulphophenylimino, 2-methyl-5-sulphophenylimino, 2-sulpho-5-methylphenylimino, 5-hydroxy-6-(2-sulphophenylazo)-7-sulphonaphth-2-ylimino and 2,2'-disulpho-4,4'-diimino-stilbene.

Water-solubility is enhanced by the presence of acid groups such as carboxylic acid and sulphonic acid groups and also by groups represented by NR$^1$R$^2$, especially where R$^1$ and/or R$^2$ are hydroxyethyl or NR$^1$R$^2$ is morpholino. It is preferred that the dye carries at least five, and more preferably at least six, such water-solubilising groups. However, sulphonic acid groups are generally superior to carboxylic acid groups at confering water-solubility and it is thus preferred that each azo chromophore carries at least two, and more preferably at least three sulphonic acid groups. Where the dye contains two azo chromphores it preferably carries at least five, and more preferably at least six, sulphonic acid groups.

The species M, associated with the sulphonic acid groups, may be any suitable metal which does not render the dye water-insoluble but is preferably an alkali metal, such as sodium, potassium or lithium or alternatively ammonium, including substituted ammonium, such as mono-, di, tri- and quaternary alkyl- and substituted-alkyl-ammonium.

Examples of specific dyes of Formula I are:

Dye 1. A dye of Formula I wherein R$^1$ is hydroxyethyl, R$^2$, Q, B and F are H, p=1, L is copper, q=1, T and E are CH$_3$, M is sodium, D is 2,5-disulphophenylazo and X is hydroxyethyl-amino.

Dye 2. A dye of Formula I wherein R$^1$ is hydroxyethyl, R$^2$, T, B and F are H, E is CH$_3$, M is potassium, L is copper, Q is SO$_3$K, q=1, p=1, D is 2,5-disulphophenylazo (K salt) and X is 5-hydroxy-6-(2-sulphophenylazo)-7-sulpho-naphth-2-ylimino (K salt).

Dye 3. A dye of Formula I wherein R$^1$ is hydroxyethyl, R$^2$, B, F and T are H, p=1, L is copper, q=1, M is sodium, E is CH$_3$, Q is SO$_3$Na, D is 2,5-disulphophenylazo (Na salt) and X is 2-methyl-5-sulphophenylamino (Na salt).

Dye 4. A dye of Formula I wherein R$^1$ is hydroxyethyl, R$^2$, B, F, Q and T are H, E is CH$_3$, D is 2,5-disulphophenylazo (K salt), M is potassium, L is copper, q=1, p=1 and X is 5-hydroxy-6-(2-sulphophenylazo)-7-sulpho-naphth-2-ylamino (K salt).

Dye 5. A dye of Formula I wherein R$^1$ is hydroxyethyl, R$^2$, B, F and Q are H, E and T are CH$_3$, D is 2,5-disulphophenylazo (K salt), M is potassium, L is copper, q=1, p=1 and X is 5-hydroxy-6-(2-sulphophenylazo)-7-sulpho-naphth-2-ylamino (K salt).

Dye 6. A dye of Formula I wherein X is NR$^1$R$^2$, R$^1$ is C$_3$H$_6$OC$_2$H$_4$OH, R$^2$, B, F and T are H, E is CH$_3$, Q is SO$_3$Na, D is 2,5-disulphophenylazo (Na salt), M is sodium, L is chromium, q=½ and p=1.

Dye 7. A dye of Formula I wherein p=1, X is NR$^1$R$^2$, each NR$^1$R$^2$ is morpholino, B, F and T are H, E is CH$_3$, Q is SO$_3$Na, q=½, L is cobalt, D is 2,5-disulphophenylazo (Na salt) and M is sodium.

Dye 8. A dye of Formula I wherein R$^1$ is 3-hydroxypropyl, R$^2$, B, F and T are H, E is CH$_3$, Q is SO$_3$Na, D is 2,5-disulphophenylazo (Na salt), M is sodium, L is copper, q=1, p=2 and X is 2,2'-disulpho-4-4'-diiminodiphenyl.

Dye 9. A dye of Formula I wherein R$^1$ and R$^2$ are hydroxyethyl, B, F and T are H, E is CH$_3$, Q is SO$_3$Na, D is 2,5-disulphophenylazo (Na salt), M is sodium, L is copper, q=1, p=2 and X is 1,2-diiminoethane.

Dye 10. A dye of Formula I wherein X is NR$^1$R$^2$, R$^1$ is (CH$_2$)$_6$OH, R$^2$, B, F and T are H, E is CH$_3$, Q is SO$_3$Na, D is 2,5-disulphophenylazo (Na salt), M is sodium, L is cobalt, q=½ and p=1.

Dye 11. A dye of Formula I wherein p=1, X is NR$^1$R$^2$, each NR$^1$R$^2$ is morpholino, B, F and T are H, E is CH$_3$, Q is SO$_3$K, D is 2,5-disulphophenylazo (K salt), M is potassium, L is 70/30 chromium/cobalt and q=½.

Dye 12. A dye of Formula I wherein R$^1$ and R$^2$ are hydroxyethyl, B, F and T are H, E is CH$_3$, Q is SO$_3$Na, D is 2,5-disulphophenylazo (Na salt), M is sodium, L is copper, q=1, p=2 and X is 4,4'-diiminostilbene.

Dye 13. A dye of Formula I which is identical to Dye 1 except that D is 3,6,7-trisulphonaphth-2-ylazo (K salt).

Dye 14. A dye of Formula I which is identical to Dye 1 except that D is 4-chloro-2,5-disulphophenylazo (K salt).

Dye 15. A dye of Formula I which is identical to Dye 1 except that D is 4-nitro-2-sulphophenylazo (K salt).

Dye 16. A dye of Formula I which is identical to Dye 1 except that D is 2-hydroxy-5-disulphophenylazo (K salt).

Dye 17. A dye of Formula I which is identical to Dye 1 except that D is 2-carboxy-4-sulphophenylazo (K salt).

Dye 18. A dye of Formula I which is identical to Dye 1 except that D is 2-sulpho-4-methylphenylazo (K salt).

Dye 19. A dye of Formula I which is identical to Dye 1 except that D is 2-sulpho-4-methoxyphenylazo (K salt).

Dye 20. A dye of Formula I which is identical to Dye 1 except that E is chlorine and M is ammonium.

Dye 21. A dye of Formula I which is identical to Dye 1 except that E is SO$_3$K.

Dye 22. A dye of Formula I which is identical to Dye 1 except that E is aminosulphonyl and M is ammonium.

Dye 23. A dye of Formula I which is identical to Dye 1 except that E is methylaminosulphonyl.

Dye 24. A dye of Formula I which is identical to Dye 1 except that X is diethylamino.

Dye 25. A dye of Formula I which is identical to Dye 1 except that X is NH$_2$ and M is tetra(hydroxyethyl)ammonium.

Dye 26. A dye of Formula I wherein R$^1$ is hydroxyethyl, R$^2$, Q, T, B and F are H, E is CH$_3$, L is copper, q=1, M is sodium, D is 2,5-disulphophenylazo, X is 2-methyl-5-sulpho-phenylamino and p=1.

THE MIXTURE OF FIRST AND SECOND DYES

Individual dyes in accordance with Formula I range in shade from deep blue to deep black and dyes with black shades are particularly desirable because of the widespread use of black printing inks. The shades of those dyes in accordance with Formula I which are not truly black can be rendered truly black by admixture with a second dye having a yellow to red shade.

According to a second aspect of the present invention there is provided a mixture of a dye of Formula I and a dye of the formula:

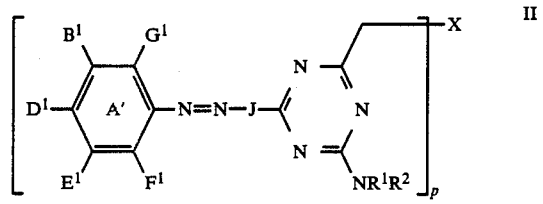

$B^1$, $D^1$, $E^1$, $F^1$ and $G^1$, are H or substituents or $B^1$ and $D^1$ form a second benzene ring fused to ring A which is optionally substituted, provided that neither $G^1$ nor $F^1$ is hydroxy;

J is selected from:

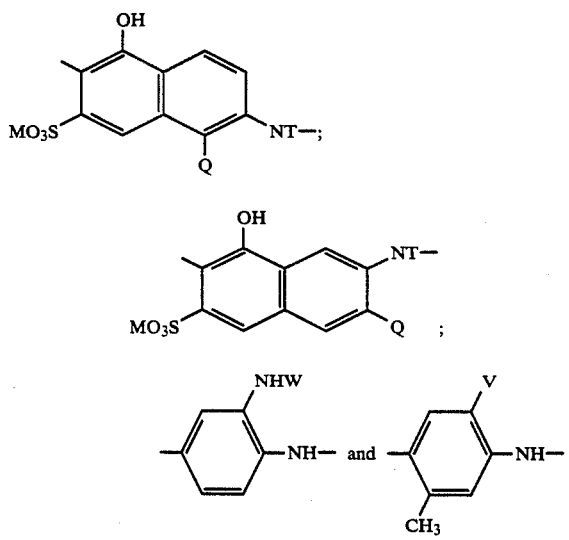

wherein
T is H or alkyl;
W is an acyl group;
V is alkyl or alkoxy; and
$R^1$, $R^2$, p, Q, M and X are as defined in Formula I.

Examples of the substituents on Ring A' represented by $B^1$, $D^1$, $E^1$, $F^1$ and $G^1$, or on the fused ring represented by $B^1$ and $D^1$ together, are H, —$SO_3M$, $NHCOCH_3$, —COOM, mono- and di-alkylamino, alkyl, ureido, alkoxy, hydroxy, nitro and halogen, and it is especially preferred that from one to three of these substituents is —$SO_3M$. The alkyl radicals in the groups represented by $B^1$, $D^1$, $E^1$, $F^1$, $G^1$, T, V and W in Formula II are preferably $C_{1-4}$-alkyl, especially methyl or ethyl.

The acyl group represented by W is preferably aminocarbonyl or sulphonyl, alkyl- or aryl-carbonyl or sulphonyl, and especially $NH_2CO$, $C_{1-4}$-alkyl-carbonyl or sulphonyl, such as acetyl, or phenylcarbonyl, such as benzoyl.

Specific examples of preferred dyes of Formula II are:

Dye A. A dye of Formula II in which J is 1-hydroxy-3-sulpho-6-imino-naphth-2-yl (Na salt), B' and D' form a second benzene ring fused to Ring A and carrying an $SO_3Na$ group in the position adjacent to the point of attachment of D' to Ring A: E', F' and $R^2$ are H, $R^1$ is hydroxyethyl, p=1, G' is $SO_3Na$ and X is 4,4'-dimino-2,2'-disulphodiphenyl (Na salt).

Dye B. A dye of Formula II in which J is 1-hydroxy-3-sulpho-6-imino-naphth-2-yl (Na salt), B', D', E', F' and $R^2$ are H, $R^1$ is hydroxyethyl, p=1, G' is $SO_3Na$ and X is 4,4'-dimino-2,2'-disulphodiphenyl (Na salt).

Dye C. A dye of Formula II wherein J is 1-hydroxy-3-sulpho-6-imino-naphth-2-yl (Na salt), X is $NR^1R^2$, B' D' E' F' and $R^2$ are H, $R^1$ is hydroxyethyl, p=1 and G' is $SO_3Na$.

The proportions of the two dyes in the mixture will vary according to their shades and tinctorial strengths. Generally, the bluer the shade and higher the strength of the dye of Formula I the greater will be the proportion of the dye of Formula II required to render it truly black. The amount of the dye of Formula I is generally higher than that of the dye of Formula II, the proportion of latter preferably varying from 0 to 50%, more preferably from 0.5% to 40%, of the total weight of the mixture. Specific examples of mixtures of dyes in accordance with Formula I and Formula II are:

Dye 27. A mixture comprising 5 parts of Dye 3 and 3 parts of Dye A.

Dye 28. A mixture comprising 10 parts of Dye 3 and 7 parts of Dye A.

Dye 29. A mixture comprising 5 parts of Dye 3 and 3 parts of Dye B.

PREPARATION OF FIRST AND SECOND DYES p The dye of Formula I may be prepared by reaction of cyanuric chloride with the free amine group of a metallised J acid or sulpho-J acid chromophore and reacting the two remaining free chlorine atoms on the triazine ring with an amine $HNR^1R^2$ alone, or sequentially with an amine $X(NH_2)_p$ and the amine $HNR^1R^2$. The dye of Formula II may be prepared in an analogous manner using the chromophore containing the group represented by J in place of the J acid chromophore.

In all the dyes referred to in this specification it is preferred that alkyl groups are $C_{1-4}$-alkyl and aryl groups are phenyl, naphth-1-yl or naphth-2-yl.

The invention with respect to the dye is further illustrated by the following examples in which all parts and percentages are by weight unless otherwise indicated.

EXAMPLE 1

A dyebase of Formula (A) (35 g, 0.02M) was dissolved in water (350 cm$^3$) at 35°–40° C.

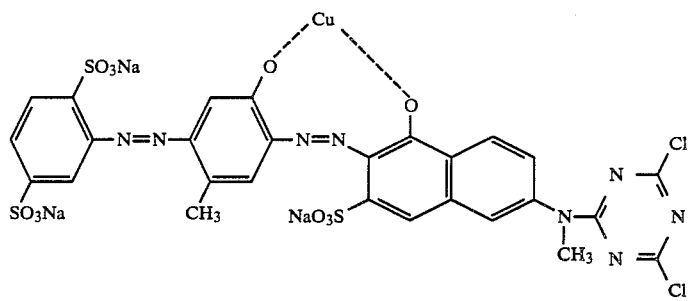

(A)

A solution of ethanolamine (12 g, 0.2M) in water (50 cm³) was added and the mixture held at 35°–40° C. for 12 hours. The temperature was then raised to 70°–80° C. for 12 hours. The solution was cooled to room temperature and sodium chloride added (20%, 80 g). The solid was collected by filtration, redissolved in distilled water (300 cm³) and the solution subjected to dialysis in order to remove inorganic compounds. The resulting solution was evaporated to dryness at 60° C. in vacuum and finally dried at 40° C. to yield 12.2 g of Dye 1, i.e. the dyestuff of Formula I wherein $R^1$ is hydroxyethyl, $R^2$ is H, p=1, L is copper, q=1, T and E are $CH_3$, M is sodium, B and F are H, D is 2,5-disulphophenylazo and X is hydroxyethylamino.

EXAMPLE 2

Stage 1

A solution was prepared by mixing 25.3 g aniline-2,5-disulphonic acid (0.1M) with 125 g water and sufficient of a 32% aqueous solution of sodium hydroxide to give a neutral solution. The mixture was then stirred with 7.25 g sodium nitrite and the resultant solution added to 20 g 36% hydrochloric acid and 50 g ice over 10 minutes with suitable agitation. The resultant suspension was held at 15°–20° C. for 15 minutes after which 10% sulphamic acid solution was added to remove excess nitrous acid and 20% sodium carbonate solution to raise the pH to 4.0–4.5.

A solution of 13.7 g cresidine (0.1M) in 50 g water and 8.7 g 36% hydrochloric acid (8.7 parts) was prepared at 60° C. The solution was added slowly to a mixture of 125 g water, 20 g sodium acetate and 40 g ice at <10° C.

The diazo compound prepared above was added to the suspension of cresidine over 15 minutes at <10° C. The suspension was stirred 18 hours and the product collected by filtration, washed with saturated sodium chloride solution and dried at 40° C. to give 85 g of the amino-azo dye 2-methoxy-4-(2,5-disulphophenyl)-5-methylaniline, as sodium salt, (0.092 moles, yield 92.15%).

Stage 2

A solution of 92.3 g of the amino-azo dye prepared in Stage 1 (0.1M) in 250 g water at pH 7.5–8.0 was prepared and 52.5 g 2N sodium nitrite solution (0.105M) was added. The resulting solution was added to 50 g 36% hydrochloric acid and 250 g ice over 15 minutes at 0°–5° C. and the mixture stirred for 15 minutes after which excess nitrous acid was removed by the addition of 10% sulphamic acid.

The solution of the diazotised amino-azo dye was then added, at 15° C., over 20 minutes to a solution of 35.1 g sulpho-J-acid (0.11M) in 300 g water. At the same time 170 g of 8% sodium hydroxide solution was added dropwise to the reaction to maintain the pH value at 7.5–8.5. The coupling mixture was stirred 1 hour at 15° C. heated to 80° C., sufficient salt to give a 15% wt/vol solution added and stirred for a further ½ hour at 70°–80° C. The suspension was filtered hot and the product washed with saturated brine (600 ml) and dried. The product contained 106 g of the disazo dye, 1,7-disulpho-2-amino-5-hydroxy-6-(4-[2,5-disulpho-phenylazo]-5-methyl-phenylazo)-naphthalene, as sodium salt, (0.079 moles, yield=79.8%).

Stage 3

The dye prepared in Stage 2 (40.2 g, 0.03M) was added to a solution of copper sulphate (15.6 g $CuSO_4.5H_2O$) and diethanolamine (2.46 g) in water (250 cm³). The mixture was heated to reflux, 100° C., for 18 hours, cooled to room temperature and screened to remove insoluble material. Sodium chloride (20%, 60 g) was added at pH 5.5 and the precipitated disazo dye collected by filtration, washed with 20% sodium chloride solution and dried (26.4 g, 0.019M).

Stage 4

To a solution of disazo dye prepared in Stage 3 (0.01M) in 100 g water at 18°–20° C. was added evenly a solution of 1.85 g cyanuric chloride in 30 g acetone with rapid agitation. The pH was maintained at 5–6 by the addition of 8% sodium hydroxide solution and the reaction was complete in 1 hour. The solution was screened and a neutral solution of 2.70 g J-Acid (0.01M) in 100 g water was added. This solution was warmed to 35° C. over 1 hour and this temperature maintained a further 1 hour. At the same time a pH value of 6.0–6.5 was maintained by the addition of 8% sodium hydroxide solution. The reaction was tested for completion by thin-layer chromatography.

To the solution was added 6 g ethanolamine and this was then heated to 50°–55° C. for 7 hours. The reaction mixture was cooled to room tempertaure and 150 g salt (25% w/v) added to precipitate the dye. The product was collected by filtration and washed with 25% sodium chloride solution to give a paste containing the dye of Formula I wherein $R^1$ is hydroxyethyl, $R^2$ B and F are H, E is $CH_3$, M is sodium, L is copper, Q is $SO_3Na$, q=1, p=1, D is 2,5-disulphophenylazo and X is 5-hydroxy-7-sulpho-naphth-2-ylamino (Na salt).

Stage 5

A solution of 1.73 g orthanilic acid (0.01M ) in 100 g water at pH 8.0 was prepared, using 8% sodium hydroxide solution. To this solution was added 5.25 g of 2N sodium nitrite solution and the whole cooled to 0°–5° C. To this was then added 5 g of 36% hydrochloric acid and excess nitrous acid maintained for 30 minutes at 0°-5° C. Excess nitrous acid was then removed by the addition of 10% sulphamic acid.

A solution containing 0.01M of the dye produced in Stage 4 in 125 g water was prepared and cooled to 0°-5° C. The diazotised orthanilic acid solution described above was added over 15 minutes at 0°-5° C. and the pH maintained at 7.5-8.5 by the addition of 20 g 8% sodium hydroxide solution. The solution was stirred to room temperature and 80 g anhydrous potassium acetate added and dissolved on further agitation. The dye was thus precipitated and collected by filtration, washed with 160 g ethanol/water (3:1 v/v) and then 160 g ethanol. After drying at 40° C., the solid was redissolved in 115 g distilled water and subjected to dialysis. The resulting solution, free from inorganic compounds, was evaporated to dryness at 50°-60° C. in vacuum to yield the dye hereinbefore identified as Dye 2, i.e. the dye of Formula I wherein $R^1$ is hydroxyethyl, $R^2$, B and F are H, E is $CH_3$, M is potassium, L is copper, Q is $SO_3Na$, q=1, p=1, D is 2,5-disulphophenylazo (K salt) and X is 5-hydroxy-6-(2-sulphophenylazo)-7-sulpho-naphth-2-ylamino (K salt).

EXAMPLE 3

The dye of Formula (B) (50 g; 0.025M), prepared by the process described in Example 4 of UK 1189312,

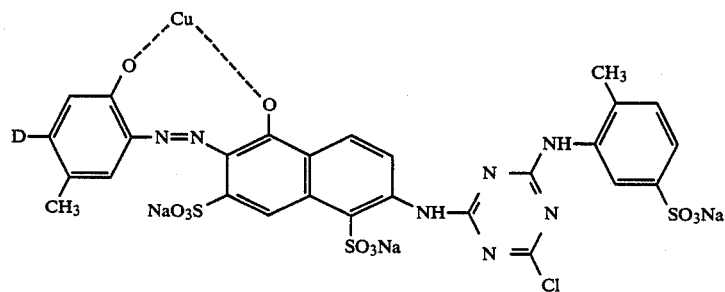

(B)

wherein D is 2,5-disulphophenylazo, was dissolved in water (300 g) at room temperature and ethanolamine (15 g) added. The solution was heated to 60°-70° C. for 12 hours and cooled to room temperature. Sodium chloride (10%, 35 g) was added and the precipitated product collected by filtration and washed with 10% sodium chloride solution. The solid was redissolved in 250 g distilled water and subjected to dialysis. The resulting solution, free from inorganic compounds, was evaporated to dryness at 60° C. in vacuum to yield Dye 3 identified hereinbefore (24 g; 0.018M), i.e. the dye of Formula I wherein $R^1$ is hydroxyethyl, $R^2$, B, F and T are H, p=1, L is copper, q=1, M is sodium, E is $CH_3$, Q is $SO_3Na$, D is 2,5-disulphophenylazo (Na salt) and X is 2-methyl-5-sulphophenylamino (Na salt).

EXAMPLE 4

Stage 1

To a solution of the monoazo dye, 1-hydroxy-2-(2-sulphophenylazo)-3-sulpho-6-aminonaphthalene (0.1M), in water (500 g) at pH 7.5 at 2° C. was added a solution of 18.5 g of cyanuric chloride in acetone (150 g), with rapid agitation. The temperature was maintained below 5° C. using ice, and the pH maintained at 5-6 by the addition of 1M sodium hydroxide solution. The reaction was complete after 1.5 hours.

To the suspension so produced was added a solution of J-acid (0.1M) in water (700 g) at pH 8. The temperature was allowed to rise over approximately 1 hour to 22° C. and the pH maintained at 6-6.5 by the addition of 1M sodium hydroxide solution. After a total of 3 hours, the temperature was raised to 30° C. for 1 hour. Salt (15% w/v) was then added and the mixture allowed to cool to room temperature. The product was filtered off and pressed to give a paste. The paste was re-slurried in water (700 g) and monoethanolamine (30 g) added. The solution was heated to 55°-60° C. for 4 hours. The solution was cooled to room temperature and ethanol (800 g) added followed by potassium acetate (140 g). The product was filtered off and washed with ethanol (800 g) to produce a dye paste.

Stage 2

A solution of the amino-azo dye produced in Stage 1 of Example 2 (0.1M) was diazotised as described in Stage 2 of Example 2 and added slowly to a solution of the dye of formula (F) (0.1M) in water (600 g) at pH and 5°-10° C., maintaining the pH at 6-7 by the addition of 8% sodium hydroxide solution. After 2 hours, the solution was allowed to warm to room temperature and potassium acetate (320 g) added followed by methanol (800 g). The product was filtered off and washed with ethanol (800 g).

Stage 3

To the product of the Stage 2 (0.04M) in water (500 g) was added a solution of copper sulphate pentahydrate (20.0 g) and diethanolamine (24.4 g) in water (500 g). The solution thus formed was heated to 90°-95° C. for 20 hours. After cooling to room temperature the pH was adjusted to 4.8 with concentrated hydrochloric acid, and the potassium acetate (200 g) added. Ethanol (500 g) was added and the product filtered off. The resulting solid was re-dissolved in the minimum quantity of water, at pH 7.5, and subjected to dialysis. The resulting solution, free from inorganic compounds, was evaporated to dryness at 50°-60° C. in vacuum to yield the dye hereinbefore identified as Dye 4 i.e. the dye of Formula I wherein $R^1$ is hydroxyethyl; $R^2$, B, F, Q and T are H; E is $CH_3$; D is 2,5-disulphophenylazo (K salt); M is potassium; L is copper; q=1; p=1 and X is 5-hydroxy-6-(2-sulphophenylazo)-7-sulphonaphth-2-ylamino (K salt).

EXAMPLE 5

Stage 1

To a solution of the dye of Formula (C) prepared as described in Example 2 of Swiss Pat. No. 374,132 (50 g, 0.025M) in water (400 g), at 0°-2° C. and pH 5.5, was added a solution of cyanuric chloride (4.7 g) in acetone (40 g), with rapid agitation.

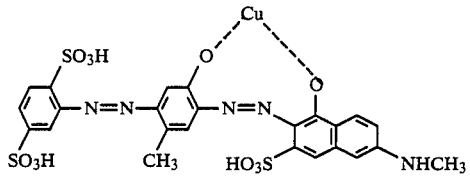

(C)

The temperature was maintained at 0°-2° C. with external cooling and the pH at 5-6 by the addition of 2M sodium hydroxide solution. The reaction was adjudged to be complete when 1 equivalent of sodium hydroxide had been consumed. The solution was filtered, allowed to warm to room temperature and the pH adjusted to 7. To this solution was added a solution of J-acid (7.1 g) in water (100 g) at pH 7. The temperature was raised to 35°-40° C. and the pH held at 7 by the addition of 2M sodium hydroxide solution. After 2 hours monoethanolamine (15 g) was added and the temperature raised to 75°-80° C. for 12 hours.

After cooling to room temperature potassium acetate (30% w/v) was added and a volume of ethanol equal to the volume of the solution. The product was filtered off and washed with ethanol (1000 g).

Stage 2

To a solution of the product of Stage 1 (47.7 g; 0.0166M) in water (300 g) at pH 8-9 and 0°-10° C. was added diazotised orthanilic acid (0.0166M), prepared as in Stage 5 of Example 2. The pH was maintained at 8-9 for 12 hours. The solution was allowed to rise in temperature to 20° and potassium acetate (20% w/v) added. Ethanol (150 g) was added and the product filtered off. The product was washed with aqueous ethanol (1:1; 200 g) and washed dry for 1 hour.

The solid was dissolved in the minimum of water, at pH 7.5, and subjected to dialysis. The resulting solution, free from inorganic matter, was evaporated to dryness at 50°-60° C. in vacuum to yield the dye hereinbefore identified as Dye 5, i.e. the dye of Formula I wherein $R^1$ is hydroxyethyl; $R^2$, B, F and Q are H; E and T are $CH_3$; D is 2,5-disulphophenylazo (K salt); M is potassium; L is copper; q=1; p=1 and X is 5-hydroxy-6-(2-sulphophenylazo)-7-sulphonaphtho-2-amino (K salt).

EXAMPLE 6

Stage 1

To a solution of chromic chloride hexahydrate (0.0125M) in water (100 g) was added the dye prepared in Stage 2 of Example 2 (0.025M) and the mixture refluxed for 18 hours, when tlc showed the reaction to be complete. After cooling to room temperature, sodium chloride (10% w/v) was added and the product filtered off. The product was washed with saturated brine (100 g) and pulled dry.

Stage 2

To a solution of the dye, prepared in Stage 1 (0.0025M), in water (300 g), at pH 6.2 and 16°-20° C., was added cyanuric chloride (1 g) in acetone (10 g), with vigorous agitation. The pH was maintained at 6-6.5 by the addition of 1M sodium hydroxide solution. After 45 minutes 2-(3-aminopropoxy)-ethanol (10 g) was added and the temperature raised to 55°-60° C. After 4 hours the mixture was cooled to room temperature and saturated with salt. The pH was adjusted to 7 and the product filtered off. It was washed with saturated brine (50 g) and pulled dry. The resulting solid was dissolved in the minimum of water, at pH 7.5 and subjected to dialysis. The resulting solution, free from inorganic compounds, was evaporated to dryness at 50°-60° C. in vacuum to yield the dye hereinbefore identifed as Dye 6, i.e. the dye of formula (1) in which X is $NR^1R^2$; $R^1$ is $C_3H_6OC_2H_4OH$; $R^2$, B, F and T are H; E is $CH_3$; Q is $SO_3Na$; D is 2,5-disulphophenylazo (Na salt); M is sodium; L is chromium; q=½ and p=1.

EXAMPLE 7

Stage 1

To a solution of cobaltous acetate tetrahydrate (0.02M) in water (100 g) and concentrated hydrochloric acid (8 g), was added the dye prepared in Stage 2 of Example 2 (0.04M), and the mixture refluxed for 18 hours, when tlc showed the reaction to be complete. Sodium chloride (50 g) was added and the mixture cooled to room temperature. The product was filtered off and washed with saturated brine (100 g) and then with acetone (200 g).

Stage 2

To a solution of the cobalt complex prepared in Stage 1 (0.0025M) in water (150 g) at pH 6 and 16°-20° C., was added cyanuric chloride (1 g) in acetone (10 g), with vigorous stirring. The pH was controlled at 6-6.5 by the addition of 1M sodium hydroxide solution. After 1 hour the reaction was complete.

Stage 3

To the reaction mixture at the end of Stage 2 was added morpholine (8.7 g) and the mixture heated to 55°-60° C. for 4 hours. After cooling to room temperature the solution was saturated with salt, the pH adjusted to 7, the product filtered off and washed with saturated brine (100 g). The resulting solid was dissolved in the minimum of water and subjected to dialysis. The resulting solution, free from inorganic matter, was evaporated to dryness at 50°-60° C. in vacuum to yield the dye hereinbefore identified as Dye 7, i.e. the dye of Formula I in which X is $NR^1R^2$; $R^1$ and $R^2$ together are morpholino; B, F and T are H; E is $CH_3$; Q is $SO_3Na$; D is 2,5-disulphophenylazo (Na salt); M is sodium; L is cobalt; q=½ and p=1.

EXAMPLE 8

Stage 1

To a solution of the dye formed in Stage 3 of Example 2 (0.02M) in water (400 g) at 18°-20° C. and pH 6.5-7.0 was added a solution of cyanuric chloride (4.0 g) in acetone (50 g), with vigorous agitation. The pH was maintained at 6-6.5 by the addition of 1M sodium hydroxide solution, and the temperature at 16°-20° C. The reaction was adjudged to be complete when 1 equivalent of sodium hydroxide had been added. The solution was then filtered.

Stage 2

To the solution prepared in Stage 1, at pH 7, was added a solution of 2,5-disulphobenzidine (0.01M) in water (100 g) at pH 7. The solution was stirred at 35°-45° C. for 18 hours, maintaining the pH at 6-7 by the addition of 1M sodium hydroxide solution.

Stage 3

3-Aminopropanol (15 g) in water (100 g) was added to the solution resulting from Stage 2, and the temperature raised to 60°-70° C. After 8 hours the solution was cooled to room temperature and the pH adjusted to 7.0. Sodium chloride (10% w/v) was added and the product filtered off. The product was washed with brine solution (20% w/v; 400 ml) and sucked dry.

Stage 4

The resulting product was dissolved in the minimum of water, at pH 7.5 and subjected to dialysis. The resulting solution, free from inorganic compounds, was evaporated to dryness at 50°-60° C. in vacuum to yield the dye hereinbefore identified as Dye 8, i.e. the dye of formula (1) wherein $R^1$ is hydroxypropyl; $R^2$, B, F and T are H; E is $CH_3$; Q is $SO_3Na$; D is 2,5-disulphophenylazo (Na salt); M is sodium; L is copper; q=1; p=2 and X is 2,2'-disulpho-4,4'-diiminodiphenyl.

EXAMPLE 9

The procedure of Example 8 was repeated except that, in Stage 2, 1,2-diaminoethane (0.01M9 was substituted for 2,2'-disulphobenzidine and, in Stage 3, diethanolamine (21 g) was substituted for 3-aminopropanol and 25% (w/v) of sodium chloride was used to precipitate the product instead of 10% (w/v). The product was the dye hereinbefore identified as Dye 9, i.e. the dye of Formula I in which $R^1$ and $R^2$ are hydroxyethyl; B, F and T are H; E is $CH_3$; Q is $SO_3Na$; D is 2,5-disulphophenylazo (Na salt); M is sodium; L is copper; q=1; p=2 and X is 1,2-diiminoethane.

EXAMPLE 10

The procedure of Example 7 was repeated except that, in Stage 2, 6-aminohexanol (20.4 g) was substituted for morpholine, to produce the dye hereinbefore identified as Dye 10, i.e. the dye of Formula I in which X is $NR^1R^2$; $R^1$ is $(CH_2)_6OH$; $R^2$, B, F and T are H; E is $CH_3$; Q is $SO_3Na$; D is 2,5-disulphophenylazo (Na salt); M is sodium; L is cobalt; q=½ and p=1.

EXAMPLE 11

A physical mixture of 5 parts of Dye 3, as described in Example 3, and 3 parts of Dye A was prepared by combining the two dyes and thoroughly mixing them together. The mixture gives a true black shade when applied to paper.

Dye A

The dye of Formula (D) (57 g; 0.02M), prepared by the process described in Example 65 of UK No. 1283771 was dissolved in water (500 g) at 50° C.

A solution of ethanolamine (12 g) in water (15 g) was added and the mixture heated to 60°-70° C. for 12 hours. The reaction mixture was cooled slowly to room temperature and the precipitate collected by filtration and washed with 20% sodium chloride solution. The solid was reslurried in water (115 g) and the pH value adjusted to 7.5 with 36% hydrochloric acid solution. The solid was then collected and washed with 20% sodium chloride solution and redissolved in water (170 g). The solution was subjected to dialysis in order to remove inorganic compounds and finally evaporated to dryness at 50°-60° C. in vacuum to yield Dye A as hereinbefore defined (25 g; 0.125M).

The Ink

The dye of Formula I and a mixture thereof with a dye of Formula II are adapted for use in an ink, particularly a writing or printing ink based upon water and/or a water-miscible organic solvent, such as an alkanol or glycol, and especially an ink suitable for ink-jet printing wherein the ink is ejected from an orifice of a recording head in the form of liquid droplets.

For recording on paper or the like with writing tools, such as a fountain pen, felt pen, etc, it is conventional to use an ink which is a solution of a dye in water or a water miscible organic solvent and an ink of similar composition can also be used in ink-jet printing.

In ink-jet printing, droplets of ink are generated in various ways and deposited on a substrate to effect a record. Suitable inks comprise, as essential components, a recording agent, usually a dye or a pigment, a liquid vehicle, such as water, an organic solvent or mixtures thereof, and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezo-electric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is supplied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

An example of another type of device using the same system is shown in FIG. 2, in which a tubular liquid

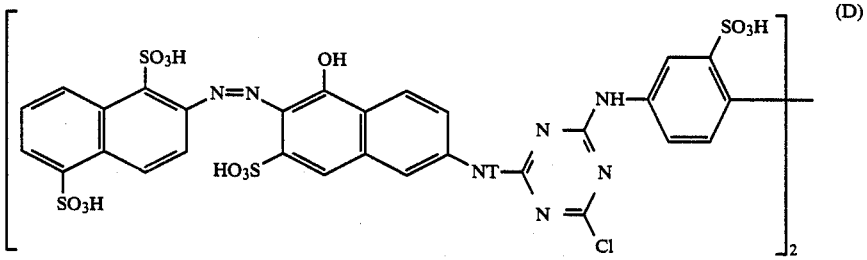

chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A—B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome hearing resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each droplet corresponding to a separate electric pulse, directed at the substrate 25.

As ink-jet printing generates little noise and allows high speed multi-colour operation without the need for special dye fixation treatments, a number of different ink-jet printing systems are currently being intensively investigated.

An ink for any of various types of ink-jet printing systems needs to meet the following criteria:

(1) Physical properties of the ink, such as viscosity and surface tension, are each within a defined range.

(2) All solutes have good solubility in the ink medium to give solutions having good stability which do not plug the fine ejecting orifices (hereinafter referred to as "solution stability").

(3) The recording agent gives images of sufficient optical density.

(4) The ink does not change in physical properties or deposit solid matter during storage.

(5) Printing can be performed without a restriction on the nature of substrate on which a record is made.

(6) The ink exhibits a high rate of fixation.

(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, an ink for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a third aspect of the present invention there is provided a ink comprising a dye of Formula I or a mixture of a dye of Formula I and a dye of Formula II.

It is possible, by use of a dye of Formula I, or a mixture of a dye of Formula I and a dye of Formula II, to obtain an ink having an improved solution stability, particularly during prolonged storage in concentrated form, and excellent recording properties, particularly ejection stability, ejection responsiveness, and continuous recording workability.

The present ink is of practical importance and gives images having good water resistance, alcohol resistance and light resistance.

The present ink preferably comprises a dye of Formula I, or a mixture of dyes of Formulae I and II, and a liquid medium, such as water, an organic solvent or a mixture thereof. The dyes of Formula I and Formula II have especially good solution stability in the above-mentioned liquid media, thereby improving the ejection stability of the ink and reducing the incidence of plugging of the ejecting orifice even after a long period of storage in the recording apparatus.

The amount of dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the dye of Formula I or Formulae I and II, other dyes selected from various types of known dyes such as direct dyes, acid dyes and the like, but preferably contains only a dye of Formula I or dyes having similar performance characteristics in ink jet printing, especially a dye of Formula II.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol, especially those of molecular weight up to 500; alkylene glycols and thioglycols containing $C_2$–$C_6$-alkylene groups such as ethylene glycol, propylene glycol, butylene glycol, triethylene glycol, thiodiglycol, hexylene glycol and diethylene glycol; other polyols such as glycerol, 1,2,6-hexanetriol, triethanolamine; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture of water, diethylene glycol and N-methyl-pyrrolidone.

The present ink preferably contains in from 5–95%, preferably 10–80%, and especially 20–50%, by weight of the water soluble organic solvent based on the total weight of the ink.

Examples of specific inks in accordance with the second aspect of the present invention are:

| Ink | Dye (parts) | Liquid medium and other components (parts) |
|---|---|---|
| 1 | 1 (3) | Water (67)<br>Diethylene glycol (30)<br>Methyl p-hydroxybenzoate (0.1) |
| 1a | 1 (3) | Water (57)<br>Ethyl alcohol (10)<br>Glycerol (30)<br>Sodium dehydroacetate (0.1) |
| 2 | 2 (5) | Water (60)<br>Diethylene glycol (20)<br>1,3-dimethyl-2-imidazolidinone (15) |
| 2a | 2 (6) | Water (49)<br>Diethylene glycol (20)<br>N—methyl-2-pyrrolidone (15)<br>Polyethylene glycol (MW 200) (10) |
| 3 | 3 (3) | Water (52)<br>Diethylene glycol (30)<br>N—Methyl-2-pyrrolidone (15) |
| 4 | 4 (3) | Water (52)<br>Diethylene glycol (30)<br>N—Methyl-2-pyrrolidone (15) |
| 5 | 5 (5) | Water (50)<br>Diethylene glycol (25)<br>N—Methyl-2-pyrrolidone (20) |
| 6 | 6 (3) | Water (62)<br>Ethylene glycol (39)<br>1,2,6-Hexanetriol (5) |
| 7 | 7 (4) | Water (61)<br>Glycerol (25)<br>Triethanolamine (10) |
| 8 | 8 (5) | Water (50)<br>Diethylene glycol (25)<br>N—Methyl-2-pyrrolidone (20) |
| 9 | 9 (4) | Water (63)<br>Ethylene glycol (30)<br>Polyethylene glycol (MW 200) (3) |
| 10 | 10 (5) | Water (50)<br>Diethylene glycol (25)<br>N—Methyl-2-pyrrolidone (20) |
| 11 | 11 (5) | Water (50)<br>Diethylene glycol (25)<br>N—Methyl-2-pyrrolidone (20) |
| 12 | 12 (3) | Water (60)<br>Diethylene glycol (20)<br>1,3-Dimethyl-2-imidazolidinone (15) |
| 13 | 13 (5) | Water (50)<br>Diethylene glycol (25)<br>N—Methyl-2-pyrrolidone (20) |
| 14 | 14 (5) | Water (50)<br>Diethylene glycol (25)<br>N—Methyl-2-pyrrolidone (20) |
| 15 | 15 (3) | Water (52)<br>Diethylene glycol (20)<br>N—methyl-2-pyrrolidone (15)<br>Polyethylene glycol (MW 200) (10) |
| 16 | 16 (5) | Water (50)<br>Diethylene glycol (25) |
| 17 | 17 (4) | N—Methyl-2-pyrrolidone (20)<br>Water (56)<br>Diethylene glycol (30)<br>2-Methoxy-2-ethoxy-2-ethoxyethanol (10) |
| 18 | 18 (5) | Water (50)<br>Diethylene glycol (25)<br>N—Methyl-2-pyrrolidone (20) |
| 19 | 19 (5) | Water (50)<br>Diethylene glycol (30)<br>N—methyl-2-pyrrolidone (15) |
| 20 | 20 (5) | Water (50)<br>Diethylene glycol (25)<br>N—Methyl-2-pyrrolidone (20) |
| 21 | 21 (5) | Water (50)<br>Diethylene glycol (25)<br>N—Methyl-2-pyrrolidone (20) |
| 22 | 22 (3) | Water (62)<br>Diethylene glycol (30)<br>Polyethylene glycol (MW 200) (5) |
| 23 | 23 (5) | Water (50)<br>Diethylene glycol (25)<br>N—Methyl-2-pyrrolidone (20) |
| 24 | 24 (5) | Water (50)<br>Diethylene glycol (25)<br>N—Methyl-2-pyrrolidone (20) |
| 25 | 25 (4) | Water (61)<br>Diethylene glycol (30)<br>N—methyl-2-pyrrolidone (5) |
| 26 | 26 (3) | Water (72)<br>Propylene glycol (20)<br>Dimethylformamide (5) |
| 29 | 29 (2) | Water (68)<br>2-Methoxy-2-ethoxy-2-ethoxyethanol (30)<br>Polyoxyethylated 4-nonylphenol (0.1) |

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioner, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present invention represents a significant step towards satisfying all the requirements stated above, that is to say, to providing an ink which does not plug capillary tubes or ejecting orifices, does not result in deterioration or formulation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention with respect to the ink is further illustrated by the following Examples in which all parts and percentages are by weight unless otherwise indicated.

EXAMPLE 12

Six inks were prepared in accordance with the following recipe, using the Dyes 1 to 5 and 27 as described above:

| Dye | 5 parts |
| --- | --- |
| Diethylene glycol | 35 parts |
| Deionised water | 60 parts |

The above-mentioned inks were prepared by thorough mixing of the ingredients, filtering the solution under pressure through a Teflon filter (pore size: 1 micron) and degassing the filtered ink, in vacuo. For each of the inks the following five characteristics, $T_1$-$T_5$, were measured using a recording apparatus having an on-demand type of recording head (50 micron-diameter ejecting orifice, piezo-oscillator driving voltage 60 V, frequency 4 KHz). Each ink gave good results in each test.

$T_1$—Prolonged Storage Stability

Each ink was sealed separately in a glass container and stored at $-30°$ C. and at $60°$ C. for 6 months. In each case there was no appreciable separation of any insoluble matter or any change in physical properties and colour.

$T_2$—Ejection Stability

Each ink was subjected to continuous recording tests at room temperature, $5°$ C., and $40°$ C. for 24 hours. Each ink gave high quality images constantly throughout the test period at each temperature.

$T_3$—Ejection Responsiveness

Each ink was subjected to intermittent ejection at two-second intervals and ejection after standing for two months and each ink showed stable uniform recording without causing plugging of the orifice.

$T_4$—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
| --- | --- |
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

$T_5$—Fixing Properties of Recording Member

Images recorded on the above-mentioned three types of recording paper were rubbed with a finger 15 seconds after recording, and without forming any smudges or blots, indicating the excellent fixation properties of the images.

EXAMPLE 13

An element for transforming electric energy into thermal energy was prepared on an alumina substrate as follows.

A $SiO_2$ (lower) layer 5 microns thick was formed over the alumina substrate by sputtering and a 1000 A $HfB_2$ layer, as a heat generating resistor layer, and a 3000 A aluminum layer, as an electrode, were successively laid thereover. A heat generating resistor pattern having size of 50×200 microns was formed by selective etching of the aluminum layer. A $SiO_2$ layer 3500 A thick, as a protective (upper) layer, was then laid thereover. A print head was formed by bonding a glass plate on which grooves 50 microns wide and 50 microns deep had been engraved onto the $SiO_2$ protective layer in register with the etched pattern on the heat generating resistor. The tip surface of orifice was then polished so that the distance between the tip of heat generating resistor and the tip surface of orifice was 250 microns.

The print head was operated by applying printing signals of $40 \text{ V} \times 10^{-5}$ sec rectangular voltage pulses at a cycle of $2 \times 10^{-4}$ sec. The print head operated normally and without blockage for 160 hours using an ink having the following composition:

| Dye 5 (decomp'n temp: 280° C.) | 5 parts |
| --- | --- |
| Diethylene glycol | 25 parts |
| N—methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye 5 with a dye of the formula:

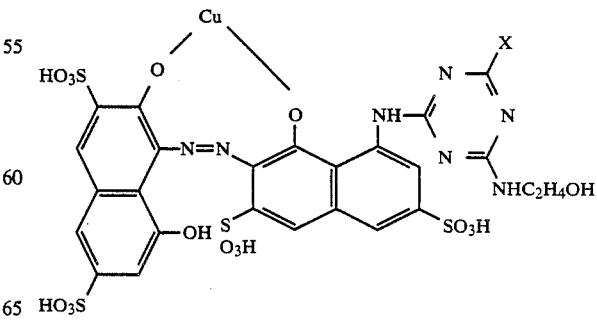

wherein X is 4-(1,5-disulpho-naphth-3-ylazo)-phenylamino.

EXAMPLE 14

The print head was operated similarly to Example 13 using inks having the composition set out in Example 13, except for the replacement of Dye 5 by the dyes listed in Table 1, by applying printing signals of 50 V×10$^{-5}$ sec rectangular voltage pulses at a cycle of 2×10$^{-4}$ sec. The resulting satisfactory operating periods are shown in Table 1.

TABLE 1

| Composition of ink | | Satisfactory Operating Period (hours) |
|---|---|---|
| Dye | Content (wt %) | |
| 1 | 5 | 150 |
| 1 | 6 | 120 |
| 2 | 5 | 180 |
| 3 | 5 | 180 |
| 4 | 5 | 120 |
| 27 | 6 | 190 |
| 28 | 5 | 140 |
| 29 | 7 | 120 |

EXAMPLES 15-20

Inks having the compositions defined in Table 2 were prepared and tested for properties $T_1$-$T_5$, in the same manner as in Example 12.

The results indicated that all these inks have good characteristics, and particularly excellent recording performance, fixation properties and sharpness of image.

TABLE 2

| Example | Dye (parts) | Liquid medium and other components (parts) |
|---|---|---|
| 15 | 1 (3) | Water (67) |
| | | Diethylene glycol (30) |
| | | Methyl p-hydroxybenzoate (0.1) |
| 16 | 5 (3) | Water (62) |
| | | Ethylene glycol (39) |
| | | 1,2,6-Hexanetriol (5) |
| 17 | 5 (2) | Water (68) |
| | | 2-Methoxy-2-ethoxy-2-ethoxyethanol (30) |
| | | Polyoxyethylated 4-nonylphenol (0.1) |
| 18 | 1 (3) | Water (57) |
| | | Ethyl alcohol (10) |
| | | Glycerol (30) |
| | | Sodium dehydroacetate (0.1) |
| 19 | 3 (3) | Water (52) |
| | | Diethylene glycol (30) |
| | | N—methyl-2-pyrrolidone (15) |
| 20 | 4 (3) | Water (52) |
| | | Diethylene glycol (30) |
| | | N—methyl-2-pyrrolidone (15) |
| 21 | 27 (3) | Water (52) |
| | | Diethylene glycol (30) |
| | | N—Methyle-2-pyrrolidone (15) |
| 22 | 28 (3) | Water (52) |
| | | Diethylene glycol (30) |
| | | N—Methyle-2-pyrrolidone (15) |

EXAMPLE 23

Each of the inks prepared in Examples 12 and 15 to 21 was charged separately into a commercial fountain pen and a record was made on plain paper. Each record showed no blotting of image and a high rate of absorption of the ink.

What is claimed is:

1. An ink comprising a liquid medium and a water soluble dye present in an amount ranging from 0.5 to 20% by weight, free from cellulose reactive groups, of the formula:

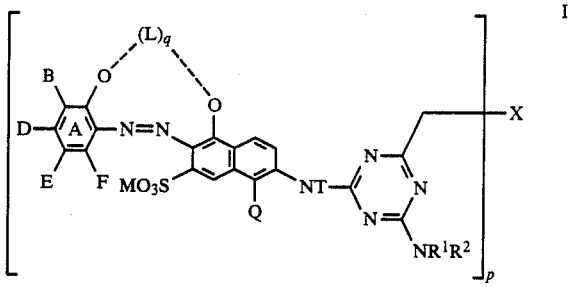

wherein $R^1$ is —$(C_aH_{2a}O)_m(C_bH_{2b}O)_nH$, $R^2$ is H or —$(C_aH_{2a}O)_m(C_bH_{2b}O)_nH$, or $R^1$ and $R^2$ together with the nitrogen atom form a morpholine ring, a and b are different and are from 2 to 8, m is from 1 to 10, n is from 0 to 9, g is ½ or 1, p is 1 or 2, L is chromium, cobalt, copper or a mixture thereof, M is H, ammonium, sodium, potassium or lithium, Q is H or $SO_3M$, T is H or $C_{1-4}$-alkyl, D is a phenylazo or naphthylazo group each of which is unsubstituted or substituted by a group selected from sulphonate; carboxylate; $C_{1-4}$-alkyl; $C_{1-4}$-alkoxy; ureido; mono- and di-$C_{1-4}$-alkylamino aminosulphonyl; mono- and di-$C_{1-4}$-alkylaminosulphonyl; aminocarbonyl; mono- or di-$C_{1-4}$-alkylaminocarbonyl; phenylamino; $C_{1-4}$-alkylcarbonylamino; hydroxy, nitro and halogen, E is H, $C_{1-4}$-alkyl, halogen and aminosulphonyl, B and F are H, provided that: when p=1

X is selected from (i) $NR^1R^2$; (ii) $NR^3R^4$; (iii) $OR^3$; and (iv) a monoazo chromophore, derived from a benzene or naphthalene diazo component and a benzene, naphthalene or mono-heterocyclic coupling component and linked to the triazine group through a group —$NR^5$— in which $R^5$ is selected from H, $C_{1-4}$-alkyl and phenyl; and $R^3$ and $R^4$ are each independently selected from H, $C_{1-4}$-alkyl, phenyl, naphthyl and phenyl or naphthyl substituted by a group selected from $C_{1-4}$-alkyl, $C_{1-4}$-alkoxy, $C_{1-4}$-alkyl-carbonylamino, ureido, mono- and di-$C_{1-4}$-alkylamino, nitro, phenylamino, halogen, carboxylate, sulphonate, hydroxy and unsubstituted and mono- and di-alkylamino-sulphonyl and carbonyl;

and when p=2

X is —$NR^3$—Z—$NR^3$—; and

Z is selected from $C_{1-6}$-alkylene; phenylene; biphenylene; $C_{1-4}$-alkylenephen-4-ylene; $C_{1-6}$-alkylene, phenylene, biphenylene or $C_{1-4}$-alkylenephen-4-ylene interrupted by a group selected from $CH_2$, O, S, $NR^3$ and $SO_2$; and $C_{1-6}$-alkylene; phenylene; biphenylene; $C_{1-4}$-alkylenephen-4-ylene interrupted by a group selected from $CH_2$, O, S, $NR^3$ and $SO_2$ and substituted by a group selected from $C_{1-4}$alkyl, $C_{1-4}$-alkoxy, $C_{1-4}$alkyl-carbonylamino, ureido, mono- and di-$C_{1-4}$-alkylamino, nitro, phenylamino, halogen, carboxylate, sulphonate, hydroxy NH₂SO₂—, NH₂CO— and mono- and di-alkylaminosulphonyl and carbonyl.

2. An ink according to claim 1 wherein NR¹R² is selected from hydroxyethyamino, di(hydroxyethyl)amino and morpholino.

3. An ink according to claim 1 wherein R¹ is hydroxyethyl; R², B, F and T are H; Q is SO₃Na; p=1; L is copper; q=1; E is CH₃; D is 2,5-disulphophenylazo (Na salt); X is 2-methyl-5-sulphophenylamino (Na salt) and M is Na.

4. An ink according to claim 1 wherein R¹ is hydroxyethyl, R², T, B and F are H, E is CH₃, M is K, L is copper, Q is SO₃K, q=1, p=1, D is 2,5-disulphophenylazo (K salt) and X is 5-hydroxy-6-(2-sulphophenyl-azo)-7-sulpho-naphth-2-ylimino (K salt).

5. An ink according to claim 1 wherein R¹ is hydroxyethyl; R², B, F, Q and T are H; E is CH₃; D is 2,5-disulphophenylazo (K salt); M is K; L is copper; q=1; p=1 and X is 5-hydroxy-6-(2-sulphophenyl-azo)-7-sulpho-naphth-2-ylamino (K salt).

6. An ink comprising a dye according to claim 1 suitable for a recording system of the type in which the ink is ejected from a small orifice in the form of a droplet directed towards a recording substrate on which an image is to be formed.

7. An ink according to claim 1 wherein the dye is dissolved in water or in water and a water-soluble organic solvent.

8. An ink according to claim 7 wherein the water soluble solvent is a polyhydric alcohol.

9. An ink according to claim 1 wherein X is NR³R⁴ or OR³ and R³ is H or C₁₋₄-alkyl and R⁴ is selected from H, C₁₋₄-alkyl and phenyl or naphthyl carrying a sulphonic acid group, SO₃M, or phenyl or naphthyl carrying a sulphonic acid group and a group selected from C₁₋₄-alkyl, C₁₋₄-alkoxy, C₁₋₄-alkylcarbonylamino, ureido, mono- and di-C₁₋₄-alkylamino, phenylamino, nitro, halogen, carboxylate, sulphonate and hydroxy.

10. An ink according to claim 9 wherein X is selected from NH₂, OCH₃, 3-sulpho-4-nitrophenylimino, 3,5-disulphophenylimino, 2-methyl-5-sulphophenylimino, 3-sulphophenylimino and 2-sulpho-5-methylphenylimino.

11. An ink according to claim 1 wherein X is a monoazo chromophore linked to the triazine group through a group —NR⁵—, in which the chromophore is selected from phenylazobenzene, phenylazo-naphthalene, naphthylazobenzene, naphthylazonaphthalene carrying two or three sulphonic acid groups and phenylazobenzene, phenylazo-naphthalene, naphthylazobenzene, naphthylazonaphthalene carrying two or three sulphonic acid groups and a group selected from C₁₋₄-alkyl, nitro, C₁₋₄-alkoxy, C₁₋₄-alkylcarbonylamino, ureido, halogen, hydroxy, mono- and di-C₁₋₄-alkylamino and phenylamino.

12. An ink according to claim 11 wherein X is selected from 5-hydroxy-6-(2-sulphophenylazo)-7-sulphonaphth-2-ylimino.

13. An ink according to claim 1 wherein Z is selected from ethylene, hexamethylene, —SO₂CH₂—, —(CH₂)₂O(CH₂)₂—, —C₂H₄SO₂C₂H₄—, 2,2'-disulpho-4,4'-diiminostilben-4,4'-ylene, stilben-4,4'-ylene, 4-(eth-2-ylene)phenylene, phen-1,4-ylene, phen-1,4-ylenesulphonyl, 2,2'-disulphodiphen-4,4'-ylene, diphen-4,4'-ylene, diphen-4,4'-ylene ether and di(phen-4,4'-ylene)methane.

14. An ink according to claim 1 wherein X is selected from hydroxyethylamino, di(hydroxyethyl)amino and morpholino.

15. An ink according to claim 1 carrying 5 or 6 sulphonic acid groups.

16. An ink comprising a mixture of the dye according to claim 1 and a dye of the formula:

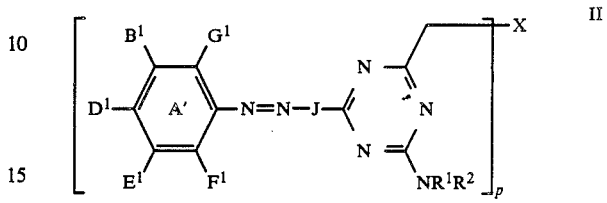

wherein R¹, R², p, Q, M and X are as defined in claim 1; B¹; D¹, E¹, F¹ and G¹, are selected from H; —SO₃M; NHCOCH₃; —COOM; mono- and di-C₁₋₄-alkylamino; C₁₋₄-alkyl; C₁₋₄-alkoxy; ureido; hydroxy; nitro and halogen or B¹ and D¹ form a second benzene ring fused to ring A which is unsubstituted or substituted by a group selected from H; —SO₃M; NHCOCH₃; —COOM; mono- and di-C₁₋₄-alkylamino; C₁₋₄-alkyl; C₁₋₄-alkoxy; ureido; hydroxy; nitro and halogen, provided that neither F¹ or G¹ is hydroxy; and J is selected from:

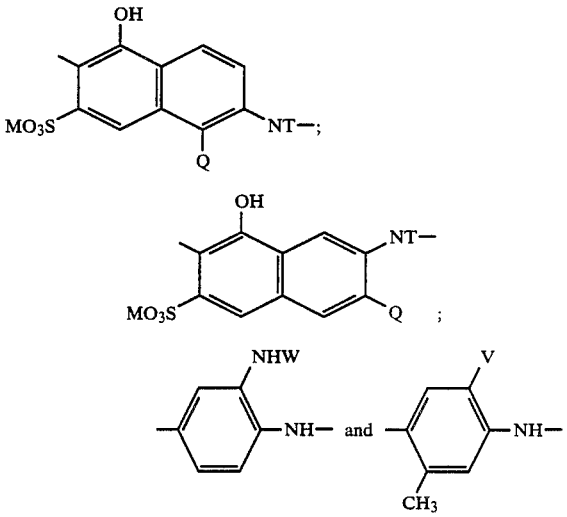

wherein
T is H, alkyl or phenyl;
W is an acyl group selected from the group consisting of aminocarbonyl, aminosulphonyl, C₁₋₄-alkylcarbonyl, C₁₋₄-alkylsulphonyl, phenylcarbonyl and phenylsulphonyl; and
V is alkyl or alkoxy.

17. An ink mixture according to claim 16 wherein:
R¹ is hydroxyethyl; R², B, F and T are H; Q is SO₃Na; p=1; L is copper; q=1; E is CH₃; D is 2,5-disulphophenylazo (Na salt); X is 2-methyl-5-sulphophenylamino (Na salt) and M is Na; and
J is 1-hydroxy-3-sulpho-6-imino-naphth-2-yl (Na salt); B¹ and D¹ form a second benzene ring fused to Ring A' and carrying an SO₃Na group in the position adjacent to the point where D¹ is attached to Ring A; E¹, F¹ and R² are H; R¹ is hydroxyethyl; p=1; X is 4,4'-dimino-2,2'-disulphodiphenyl (Na salt) and G¹ is SO₃Na.

* * * * *